United States Patent [19]
Vind

[11] Patent Number: 4,547,825
[45] Date of Patent: Oct. 15, 1985

[54] ARRANGEMENT FOR A STARTING AND PROTECTING APPARATUS STRUCTURAL UNIT FOR AN ELECTRIC MOTOR-COMPRESSOR UNIT

[75] Inventor: Holger V. Vind, Sønderborg, Denmark

[73] Assignee: Danfoss A/S, Nordborg, Denmark

[21] Appl. No.: 580,824

[22] Filed: Feb. 16, 1984

[30] Foreign Application Priority Data

Mar. 5, 1983 [DE] Fed. Rep. of Germany ....... 3307913

[51] Int. Cl.⁴ ............................................. H02H 7/085
[52] U.S. Cl. ........................................ 361/22; 361/106
[58] Field of Search .................... 361/22, 24, 105, 27, 361/106; 62/126

[56] References Cited

U.S. PATENT DOCUMENTS

Re. 31,367 8/1983 D'Entremount ....................... 361/27
2,400,665 6/1941 Thomas .................................. 62/126
4,265,091 5/1981 Kobayashi ............................. 62/126

FOREIGN PATENT DOCUMENTS 2501304 9/1982 France ................................... 361/22

Primary Examiner—Harry E. Moose, Jr.
Attorney, Agent, or Firm—Wayne B. Easton

[57] ABSTRACT

The invention relates to apparatus and an arrangement for starting and protecting an electrically driven motor-compressor unit. A protector switch and a PTC resistor have a common housing with a bore and slot construction adapted for clamping the housing to the external pressure tube of the motor-compressor unit.

4 Claims, 8 Drawing Figures (A-A)

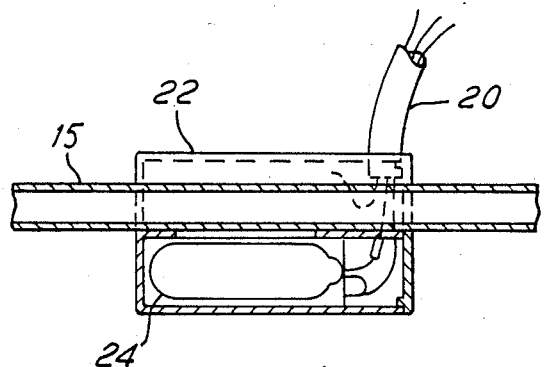
FIG. 4
(B-B)
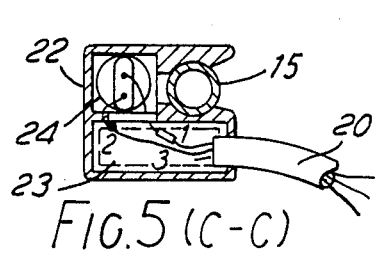 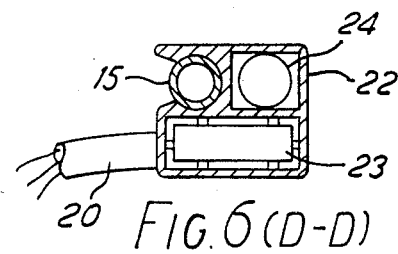
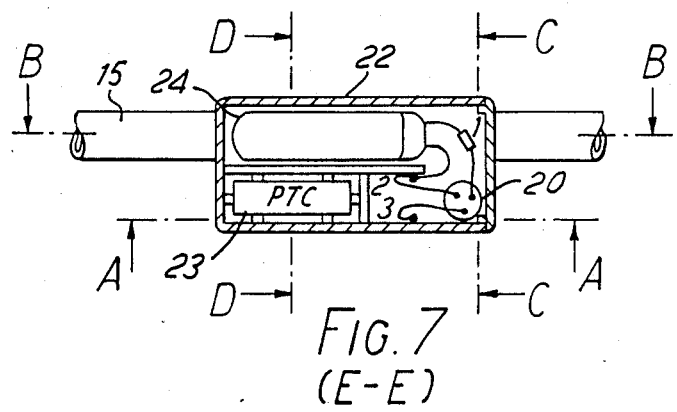
FIG. 7
(E-E)
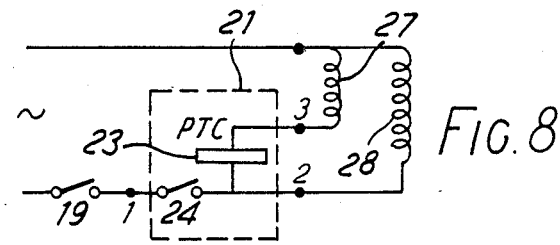
FIG. 8

ARRANGEMENT FOR A STARTING AND PROTECTING APPARATUS STRUCTURAL UNIT FOR AN ELECTRIC MOTOR-COMPRESSOR UNIT

The invention relates to an arrangement for a starting and protecting apparatus structural unit for a hermetically encapsulated electric motor-compressor unit beyond the capsule of the electric motor-compressor unit, to the output side of which a pressure tube is connected, the starting apparatus comprising a PTC resistor and the protective apparatus comprising an overcurrent-sensitive protective switch responsive to excessive temperature of the electric motor-compressor unit to interrupt the motor current.

In a known arrangement of this kind, the starting and protecting apparatus structural unit is applied to the outside of the capsule of the electric motor-compressor unit. The PTC resistor is in parallel with the thermal protective switch which is in the form of a bimetal switch. When the rotor of the electric motor is blocked during a starting attempt, e.g. if the piston of the compressor stops just in front of the deadcentre on switching the electric motor off and the high counterpressure has not yet been reduced during a renewed starting attempt, the protective switch will switch the electric motor off because of the overcurrent that occurs at this time. As soon as the bimetallic strip has cooled off, the protective switch switches the operating voltage of the electric motor on again. However, since the PTC resistor continued to be traversed by a current, it still has a high resistance so that it now impedes starting of the electric motor even if the blocking has in the meantime been eliminated.

The invention is based on the problem of providing an arrangement of the aforementioned kind which permits quick starting of the electric motor and compressor after the rotor of the electric motor is no longer blocked.

According to the invention, this problem is solved in that the PTC resistor is thermally connected to the pressure tube and in series with the protecting apparatus.

If the protective switch responds against a blocked rotor by reason of an overcurrent during a starting attempt, the PTC resistor is also switched off. Since the compressor also failed to run and the pressure gas in the pressure tube was able to cool off correspondingly, the PTC resistor is cooled so rapidly that it exhibits its low starting resistance, before the protective switch is switched on again as a result of cooling off, and initiates a renewed starting attempt. Every renewed starting attempt can therefore be successful if blocking has in the meantime disappeared. During operation, on the other hand, the warm pressure gas acts by way of the pressure tube and the thermal connection to the PTC resistor to heat the PTC resistor sufficiently to ensure that the PTC resistor retains its high resistance. The electric energy consumption of the PTC resistor can therefore be reduced correspondingly during operation.

The protecting apparatus may also be thermally connected to the pressure tube. The protecting apparatus may also cause the electric motor-compressor unit to be switched off at an excessively high gas temperature so that the compressor is protected from an excessively high gas temperature.

By means of a thermal connection of the protecting apparatus and PTC resistor, one can be more certain that the protecting apparatus will not be switched on again before the PTC resistor has cooled off.

It is particularly simple if the protective switch is in the form of a bimetallic switch.

The starting and protecting apparatus structural unit may comprise a clamp for clamping to the pressure tube. This simplifies assembly and also permits setting of the position of the structural unit on the pressure tube to adapt to the particular cooling circuit and the different climatic conditions.

Preferably, the housing of the starting and protecting apparatus structural unit comprises a bore adapted to the external diameter of the pressure tube and having a longitudinal slot for passing the pressure tube through while the longitudinal slot is elastically widened. In this construction, the starting and protecting apparatus structural unit can simply be pushed on to the pressure tube from the side thereof.

Further, the width of the longitudinal slot may decrease from the outside to the inside of the bore to a value less than the diameter of the bore. This permits simple application of the structural unit to the pressure tube with a snap fit.

The electric arrangement may be such that the protecting apparatus is in series with a parallel circuit having in one branch a starting coil of the electric motor and the PTC resistor and in the other branch a main coil of the electric motor.

A preferred example of the invention and its developments will now be described in more detail with reference to the drawing, wherein:

FIG. 4 is section B—B;

FIG. 5 is section C—C;

FIG. 6 is section D—D, and

FIG. 7 is section E—E of the FIG. 1 structural unit, and

FIG. 8 is an electric circuit diagram of the arrangement of structural unit and electric motor.

Figure 1:
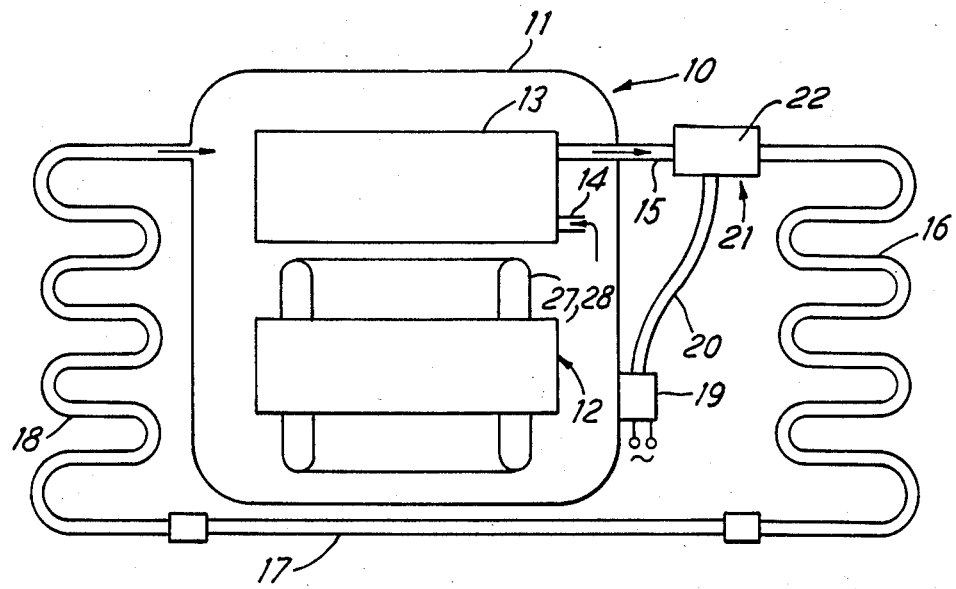
FIG. 1 shows a cooling circuit in which a starting and protecting apparatus structural unit are arranged in accordance with the invention.
Figure 2:
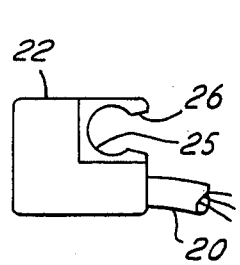
FIG. 2 is an end view of the FIG. 1 structural unit.
Figure 3:
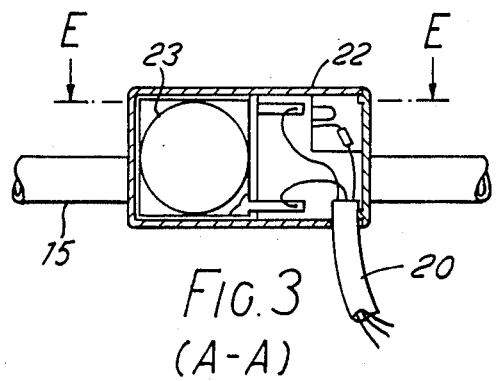
FIG. 3 is section A—A.

In the cooling circuit of FIG. 1, there is an electric motor-compressor unit 10 in which an electric motor 12 drives a compressor 13 in a hermetic capsule 11. The compressor 13 sucks the gaseous coolant through a suction tube 14 from the capsule 11 and presses same through a pressure tube 15 into a condenser 16. The liquid coolant is led from the condenser 16 through a throttle tube 17 into an evaporator 18, whence the vaporised gas flows back to the capsule 11.

A thermostat 19 on the outside of capsule 11 communicates by a cable 20 with a starting and protecting apparatus structural unit 21.

The starting and protecting apparatus structural unit 21 is mounted on the pressure tube 15 and, according to FIGS. 2 to 7, consists of a housing 22 containing a starting apparatus in the form of a PTC resistor 23 and a protecting apparatus in the form of a protective switch 24 constructed as a bimetallic switch. The PTC resistor 23 and protective switch 24 are arranged in respective chambers of the housing 22 and are thermally connected to each other and to the pressure tube 15.

The housing 22 has a bore 25 with a longitudinal slot 26. The diameter of bore 25 is adapted to the external diameter of the pressure tube 15. The width of the opening of the longitudinal slot 26 decreases towards the centre of bore 25, the smallest width being less than the diameter of bore 25. The housing 22 is of elastic material, preferably plastics and cam therefore be pushed over the pressure tube 15 with a snap fit like a clamp.

As shown by the circuit diagram of FIG. 8, the thermostat 19 and protective switch 24 are in series with each other and with a parallel circuit having in one branch the PTC resistor 23 in series with a starting coil 27 of electric motor 12 and in its other branch the main coil 28 of the electric motor 12. The connections of the structural unit 21 are designated 1, 2 and 3.

If the rotor of electric motor 12 is blocked during a starting attempt, for example because the compressor 13 was stopped shortly before the upper deadcentre of the piston of the compressor and therefore works during starting against an overpressure that still obtains on the high pressure side but has already cooled off, the PTC resistor is also rapidly cooled off before the bimetallic switch 24 switches the operating current of the electric motor on again for a renewed starting attempt after having cooled off. The starting attempts can therefore be repeated at short intervals so that operation of the compressor is very rapidly resumed after the blocking has disappeared. During operation, heating of the PTC resistor brought about through the pressure tube 15 reduces the inherent heating required to maintain the high operating temperature of the PTC resistor and consequently reduces the electric energy consumption of the PTC resistor.

By reason of the fact that the protective switch 24 is thermally connected to the pressure tube 15, the electric motor and hence the compressor is switched off upon an excessively high gas temperature, so that the compressor is protected from excessive temperature.

The thermal connection between the PTC resistor 23 and protective switch 24 ensures that the latter is likewise not switched on again before the PTC resistor 23 has cooled off. The use of a bimetallic switch 24 has the advantage that the bimetallic switch brings about switching off as early as possible, depending on whether the temperature or the operating current first exceeds the permissible limiting value.

The construction of the starting and protecting apparatus structural unit 21 as a clamp permits adaptation to the particular cooling circuit or different climatic conditions by appropriate displacement of the structural unit 21 along the pressure tube. This structural unit 21 is also substantially independent of individual cooling of the capsule 11 by a fan because the structural unit 21 does not detect the temperature of this capsule.

Different makes of PTC resistor and protective switches may be accommodated in the chambers of the housing 22 without the need for individually adapting them to the pressure tube.

The structural unit 21 need then not be connected directly to the mains but can be incorporated in the internal circuitry incorporated in the refrigerator unit at the factory.

I claim:

1. A starting and protecting unit for a hermatically encapsulated electric motor and compressor assembly having a capsule casing with an output pressure tube extending from said casing, said unit comprising a series arrangement of a temperature responsive protective switch for interupting motor current and a motor starting coil PTC resistor, means for thermally connecting said PTC resistor and said protective switch to said pressure tube, said protective switch and said PTC resistor having a common housing, clamping means for clamping said housing to said pressure tube, said housing having a bore and slot construction adapted to the external diameter of said pressure tube to facilitate connecting said housing to said pressure tube.

2. An arrangement according to claim 1 characterized in that said protecting switch is in series with a parallel circuit having one branch connectable to a starting coil for said electric motor and said PTC resistor and another branch connectable to the main coil of said electric motor.

3. An arrangement according to claim 1 wherein said protective switch and said PTC resistor are thermally connected.

4. An arrangement according to claim 1 characterized in that said protective switch is a bimetal switch.

* * * * *